June 14, 1927.
O. E. GRIGSBY
1,632,474
AUTOMOBILE WINDSHIELD VISOR
Filed April 28, 1922  2 Sheets-Sheet 1
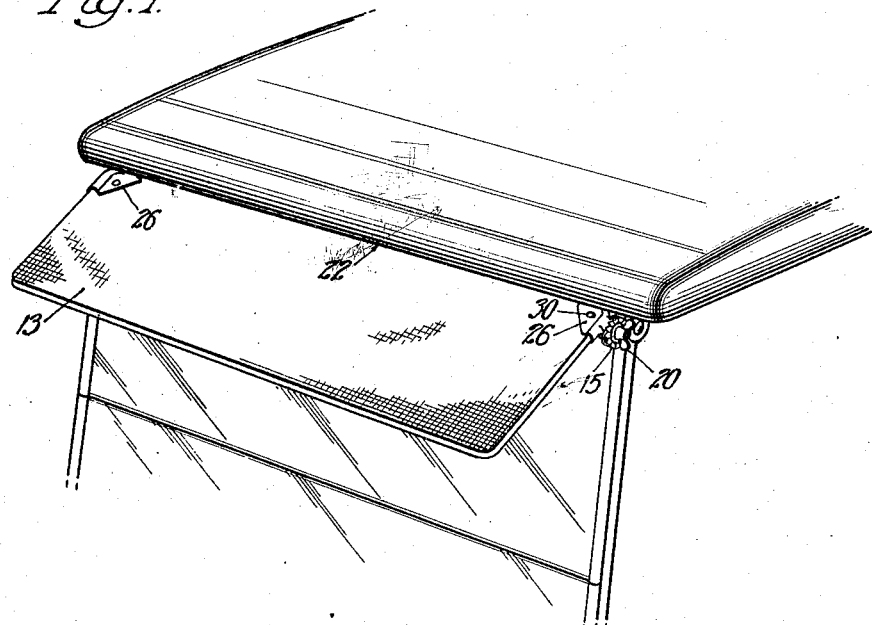
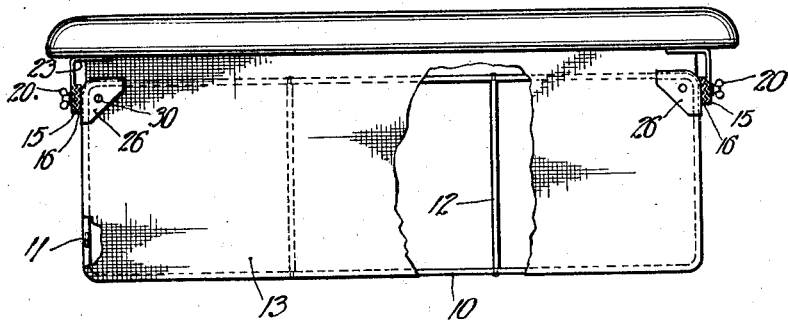
Inventor:
Owen E. Grigsby.
By: Gabel + Mueller
Attys June 14, 1927.

O. E. GRIGSBY 1,632,474

AUTOMOBILE WINDSHIELD VISOR

Filed April 28, 1922    2 Sheets-Sheet 2

Inventor
Owen E. Grigsby.
By: Gabel & Mueller
Attys.

Patented June 14, 1927.

1,632,474

UNITED STATES PATENT OFFICE.

OWEN E. GRIGSBY, OF PARK RIDGE, ILLINOIS, ASSIGNOR TO GRIGSBY-GRUNOW-HINDS CO., OF CHICAGO, ILLINOIS, A CORPORATION OF ILLINOIS.

AUTOMOBILE WINDSHIELD VISOR.

Application filed April 23, 1922. Serial No. 557,216.

My invention relates to automobile windshield visors and has to do more particularly with the portable type adapted for attachment to cars unequipped with the same, an object being to provide an improved device of this character having a more rigid frame construction, a positive adjustable locking hinge and other certain features of construction, and simplified operation hereinafter more particularly pointed out in the ensuing specification and appended claim.

In the accompanying drawings I have shown the preferred form of my invention wherein Fig. 1 is a perspective view of my improved visor mounted in front of an automobile windshield, tilted downwardly slightly;

Fig. 2 is a front view of Fig. 1 with the visor dropped downwardly into a vertical position;

Referring now more in detail to the form of my invention as shown herein, it comprises a rectangular visor frame having an outer framework 10 made up of a continuous metal rod, the ends abutting and drilled to receive a connecting stud 11 driven into each end. Heretofore in frames of this character cross braces have been welded to the outer frame but this has not provided a very rigid frame and to overcome this I have provided braces 12 having turned down ends passing through the frame and riveted thereto. This construction, I find, produces a very smooth and rigid frame.

Figure 3:
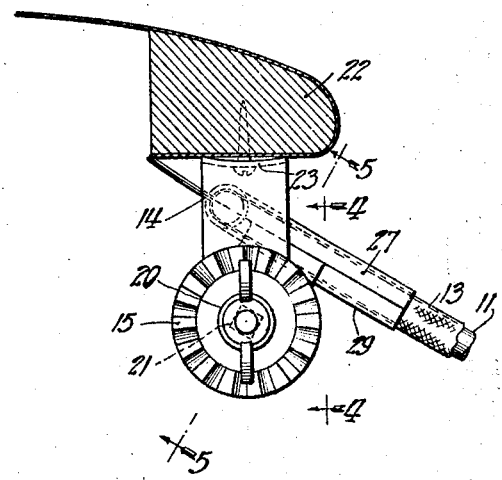
Fig. 3 is a side elevation showing the hinge enlarged.
Figure 4:
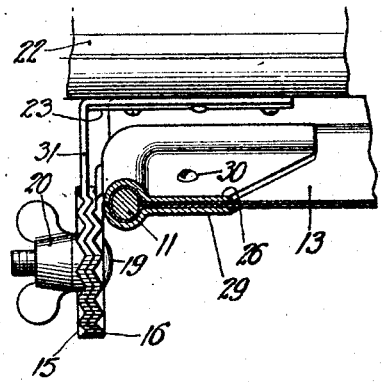
Fig. 4 is a sectional view along the line 4—4 of Fig. 3.
Figure 5:
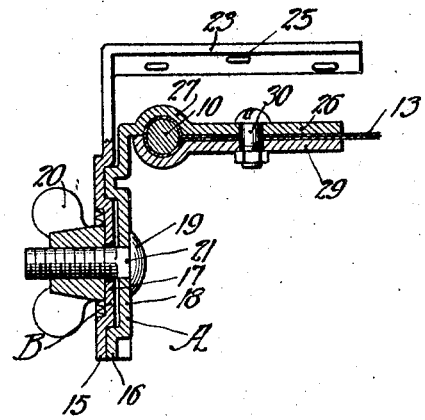
Fig. 5 is a sectional view along the line 5—5 of Fig. 3.

This framework 10 is covered by a suitable material such as any of the well known water-proof top coverings, being preferably sewed first in the form of a bag with the seams on the outside, and then turned inside out and slipped over the frame to form the cover 13, after which it is drawn taut and sewed along the edge 14, more clearly shown in Fig. 3.

In order to support the covered visor frame I provide a corrugated faced hinge yieldingly held together so that the visor may be adjusted to any desired angle and locked there if desired.

In connection with the preferred hinge I obviate prior objectionable features by the use of a non-rotatable shaft for the hinge and a thumb nut on the outside of the hinge so that it may be readily released for operation and then quickly locked.

Referring to the hinge, I preferably construct a sheet metal device comprising an inner half A and an outer half B. The halves have co-operating corrugated or toothed surfaces 15—16, the center portions 17—18 being cupped so as to provide narrow faces for the corrugations. In this way I can provide a greater number of corrugations than where they run inwardly some distance as has heretofore been done. To hold the parts together I preferably provide a non-rotatable bolt 19 and thumb nut 20, the shank of the bolt being squared at 21 where it passes through a squared hole in the hinge member A. The thumb nut 20 is preferably on the outside of the hinge so that it may be readily unscrewed to permit an operation of the hinge. Heretofore the windshield visors have been so constructed that it has been very difficult to unloosen the hinges to permit operation of the visor and a subsequent locking thereof.

Now as to the fastening means for the hinge, for the outer part B which preferably attaches to the bow or frame 22 in the top of the car, I provide a bent over horizontal arm 23 being concavo-convex as shown in Fig. 3. By this construction of the attaching portion 23, the hinge may be intimately attached to the bow 22, seating along its outer edges so that it is rigidly held against any rocking such as has been heretofore common with flat attaching parts. The wooden portions 22 to which these hinges are attached are not always perfectly flat and a great deal of trouble has been heretofore encountered by having the hinges rock on the uneven attaching surfaces. By my improved shape this difficulty has been overcome. Another difficulty heretofore encountered in attaching visor hinges is that simply screw holes have been provided and in marking off the screw point the screws did not always line up properly with the hinges. To overcome this difficulty I have provided elongated or clearance slots 25 so that any slight inaccuracy in the marking of the screw stops would still permit a ready application of the hinge.

Now as to the means for applying the hinge to the visor frame, to this end I preferably construct an angular extension or corner plate 26, channeled at 27 of a shape to intimately engage the frame 10. A component clamping plate 29 is provided to engage the other side of the frame, the two parts being clamped together preferably by a bolt 30 so as to rigidly hold the visor frame.

In the operation of the device and assuming that the angle of the visor is to be changed, the thumb nuts 20 are released sufficiently to permit a yielding of the corrugated plates of the hinges as the visor is tilted to the desired angle. The resiliency of the connecting portion 31 of the hinge plate B permits a sufficient outward swing of the corrugated part 15 so as to allow an operation of the hinge. When the visor is adjusted to the desired angle the thumb screws 20 may again be threaded into the bolt 19 to lock the hinge.

What I claim as new and desire to secure by United States Letters Patent is:

In an automobile windshield visor, a visor frame, a yieldable sheet metal corrugated hinge at each end having one portion secured to the frame and another portion for attachment to the automobile top, said top attaching portion being a bent over horizontal concavo-convex plate extension of the frame attaching hinge portion and adapted to seat along its longitudinal outer edges only in intimate contact with a substantially flat face on the supporting member of the automobile top, said plate having fastening screw receiving openings and said plate being yieldable under fastening screw pressure when attached.

In witness whereof, I hereunto subscribe my name this 28th day of February, A. D. 1922.

OWEN E. GRIGSBY.